United States Patent [19]

Salmela et al.

[11] 4,209,362
[45] Jun. 24, 1980

[54] APPARATUS FOR CONVEYING AND PROCESSING STRIP MATERIAL, ESPECIALLY PAPER TRIM

[75] Inventors: Jouko Salmela; Erik Bergmann, both of Turku; Tauno Heikkila, Lieto, all of Finland

[73] Assignee: Teollisuusmittaus OY, Turku, Finland

[21] Appl. No.: 7,609

[22] Filed: Jan. 29, 1979

[30] Foreign Application Priority Data

Jan. 30, 1978 [FI] Finland .................................. 780281

[51] Int. Cl.² .............................................. D21C 5/02
[52] U.S. Cl. ........................................ 162/264; 162/4; 162/191; 162/272
[58] Field of Search ................... 162/264, 191, 4, 272

[56] References Cited

U.S. PATENT DOCUMENTS

Re. 13,730   5/1914   Weston ......................... 162/191 X

FOREIGN PATENT DOCUMENTS

1253570  11/1967  Fed. Rep. of Germany ........... 162/191

*Primary Examiner*—Richard V. Fisher
*Attorney, Agent, or Firm*—Montague & Ross

[57] ABSTRACT

Paper trim, removed from a freshly made paper web by a slitter, is drawn by a subatmospheric pressure through a duct into a separating tank in which a suction is induced by a fan, the movement of the paper trim being killed by the circulation of pulp into this vessel from a mixing tank to which the slurry is delivered by a pipe from the bottom of the vessel. The pipe terminates in means forming a liquid seal and the solvent for the slurry is sprayed into the vessel to scrub the gas before it reaches the fan.

4 Claims, 1 Drawing Figure

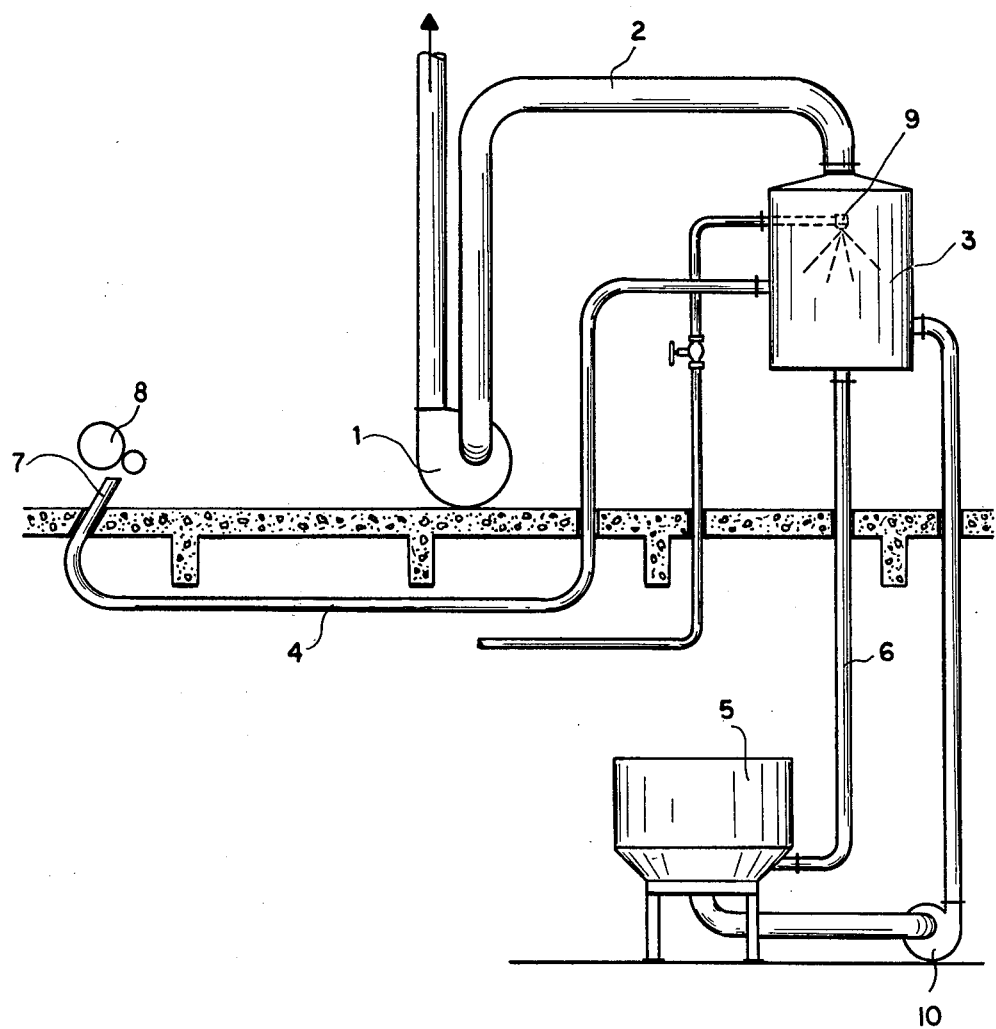

APPARATUS FOR CONVEYING AND PROCESSING STRIP MATERIAL, ESPECIALLY PAPER TRIM

BACKGROUND OF THE INVENTION

In paper manufacture, an uneven strip, the so-called trim, is cut off from both edges of the paper before the latter is wound into rolls.

As the ever increasing slitter speeds have reached such levels as 2200 m/min and, even 2500 m/min, the removal of this trim from the locality where the slitting operation takes place has become a problem. Presently the trim removal from the slitter is effected either by means of an injector system or with a so-called chopper fan. Both of these work on the principle that the trim or its fragments are transported through a duct system under superatmospheric pressure.

In a system employing an injector, the trim strips are drawn from the slitter by means of an injector which cannot be spaced by more than a few meters from the slitter.

Disadvantages of this system are a high power consumption, a high noise level in the working area, and frequent malfunctioning caused by clogging of the duct. Moreover separate sets of equipment are usually required for the two ends of the paper roll.

In a chopper-fan arrangement the fan is located right beside the slitting station. The trim is drawn by the fan suction into the fan impeller and, being cut to pieces between cutting blades, travels in pieces along with an air stream through a duct system under superatmospheric pressure.

The disadvantages are the same as those of the injector system. Furthermore, when the cutting blades wear out and become blunt, the trim wraps around the impeller fouling the fan.

SUMMARY OF THE INVENTION

The apparatus of the invention obviates the disadvantages stated above. The apparatus of the invention effects the conveyance of the trim or the like by pneumatic transport under partial vacuum all the way to the separation equipment, and at the separation equipment the trim movement is "killed" with a stream of pulp by which the transport is effected further to a mixing tank. The connection pipe between the separation equipment and mixing equipment is submerged below the liquid surface of the mixing equipment, is furnished with a water trap, whereby the resulting suction leg forms an automatic shut-off and feeding device. The dissolving liquid necessary for the operation is supplied to the system through the separation tank by spraying, at the top of the tank, in such a way that the spray arrests any impurities carried along with the air which flows to the fan and continuously washes down and into circulation the pulp partly adhering to the tank walls.

BRIEF DESCRIPTION OF THE DRAWING

The sole FIGURE of the accompanying drawing is an elevational view of the apparatus.

SPECIFIC DESCRIPTION

A partial vacuum is produced in pipe 2, separation tank 3 and conveyor duct 4 by means of a fan 1. The effluent pipe 6 from separation tank 3 is run into mixing tank 5, below the liquid surface of same, or it is furnished with a water trap. Thereby a suction leg is formed in pipe 6. This performs the function of an automatic shut-off and feeding device and prevents vacuum leaks through the mixing tank, i.e. a liquid seal is provided at the end of pipe 6 remote from the tank 3.

The partial vacuum produced by fan 1 thus maintains a strong air flow into suction nozzle 7 at the end of duct 4, which is located at trim slitter 8. The trim is drawn through nozzle 7 into duct 4, through which it travels along with the air flow at subatmospheric pressure into tank 3 of the separation system. In the separation tank 3, the strip velocity is first reduced, whereby the strip begins to separate from the air stream which, also slowed-down, continues to duct 2.

The trim movement is finally "killed" by spraying liquid on the trim in the form of pulp which has been pumped at 10 from mixing tank 5. This pulp returns to mixing tank 5 through pipe 6, and the trim is carried along with it. The solvent liquid necessary in the process is supplied to the top of separation tank 3 through spray 9 which both scrubs the air which flows to the fan free from dust and other impurities and flushes down any pulp adhering to the tank walls.

The advantages of this system, as compared with conventional ones, are obvious. The power consumption is considerably lower than that of a conventional system which is capable of conveying an equivalent trim. The handling of several trims may be effected simultaneously using only one system and fan. The fan is located outside the mill building, e.g., on the roof, whereby the noise level in the working area remains very low. The air exhausted has already been purified, and the fan comes into contact with clean air only, which reduces maintenance work and is environment-minded. A conveying system operating at a below-atmospheric pressure will not be blocked as easily as one which works at overpressure.

We claim:

1. An apparatus for collecting, transporting and processing paper strip material, comprising:
   a separating tank;
   a suction conduit connected to an upper portion of said tank and provided with a fan for inducing a subatmospheric pressure in said tank and drawing transport air therethrough;
   a transport duct connected to said tank at one end of said duct and opening at its other end at a location proximal to a source of paper strip material whereby said paper strip material is conveyed by suction through said duct into said tank;
   a mixing vessel containing paper pulp;
   pump means connected between said vessel and said tank for circulating pulp to said tank to terminate the movement of said material into said tank;
   a pipe leading from a bottom portion of said tank for carrying pulp entraining said material to said vessel; and
   means forming a liquid seal at an end of said pipe remote from said tank.

2. The apparatus defined in claim 1 wherein said means forming said liquid seal is a body of liquid in said vessel, said pipe communicating with said vessel below the level of the liquid therein.

3. The apparatus defined in claim 1, further comprising means for spraying into an upper portion of said tank a dissolving liquid for said material thereby scrubbing gas passing into said suction conduit and washing down the walls of said tank.

4. The apparatus defined in claim 1 wherein the means forming the liquid seal is a liquid trap.

* * * * *